United States Patent
Cha et al.

(10) Patent No.: US 8,167,349 B1
(45) Date of Patent: May 1, 2012

(54) AUTO RETURN STRUCTURE OF LUGGAGE ROOM SCREEN

(75) Inventors: Jun Ho Cha, Hwaseong-si (KR); Seung Kwon Cha, Yongin-si (KR); Jun Mo Ku, Hwaseong-si (KR); Yang Gi Lee, Suwon-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/174,631

(22) Filed: Jun. 30, 2011

(30) Foreign Application Priority Data

Oct. 13, 2010 (KR) ......................... 10-2010-0099830

(51) Int. Cl.
*B60J 7/00* (2006.01)

(52) U.S. Cl. .................................. 296/37.16; 160/370.22
(58) Field of Classification Search ............... 296/37.16, 296/24.4; 160/370.22
See application file for complete search history.

(56) References Cited

U.S. PATENT DOCUMENTS

| 5,224,748 | A  | * | 7/1993  | Decker et al. ............. 296/37.16 |
| 6,488,325 | B1 |   | 12/2002 | Ehrenberger et al. |
| 6,592,165 | B2 | * | 7/2003  | Ament et al. ............. 296/37.16 |
| 2008/0088145 | A1 |   | 4/2008 | Schlecht |

FOREIGN PATENT DOCUMENTS

| KR | 1999-005528 U    | 2/1999 |
| KR | 10-2007-0044861 A | 5/2007 |

* cited by examiner

*Primary Examiner* — Joseph Pape
(74) *Attorney, Agent, or Firm* — Morgan, Lewis & Bockius LLP

(57) ABSTRACT

An auto return structure of a luggage room screen may include a guide portion formed to a luggage side trim toward the rear of a vehicle body, and a reinforcement board wherein the guide portion includes a guide groove formed to the luggage side trim toward the rear of the vehicle body and slidably receiving an end portion of the reinforcement board therein, a movement groove formed to connect from ends of the lower and upper surfaces of the guide groove toward an upper part of the vehicle body to guide the end portion of the reinforcement board toward the upper part of the vehicle, and a locking protrusion formed on an upper connection portion connecting the movement groove and the upper surface of the guide groove and to which the end portion of the reinforcement board may be selectively inserted and fixed.

12 Claims, 4 Drawing Sheets

AUTO RETURN STRUCTURE OF LUGGAGE ROOM SCREEN

CROSS-REFERENCE TO RELATED APPLICATION

The present application claims priority to Korean Patent Application No. 10-2010-0099830, filed on Oct. 13, 2010 in the Korean Intellectual Property Office, the entire contents of which is incorporated herein for all purposes by this reference.

BACKGROUND OF THE INVENTION

1. Field of the Invention

The present invention relates to an auto return structure of a luggage room screen, and more particularly, to an auto return structure of a luggage room screen, which makes it possible to perform auto return of the screen through improvement of a guide structure of a luggage side trim.

2. Description of Prior Art

In general, a tailgate type vehicle has a luggage room formed between a rear seat and a tailgate to load luggage therein.

Also, a screen device is formed to intercept the exposure of luggage loaded in the luggage room to the outside and to prevent an outflow of the luggage to the rear seat.

The screen device includes a screen housing, a screen, and a reinforcement board. Both end portions of the screen housing are coupled to luggage side trims that are adjacent to the rear seat, and the screen is wound on a rotary body that is built in the screen housing. The reinforcement board is connected to an end portion of the screen, and an end portion of the reinforcement board is installed in a guide groove provided in the luggage side trim.

The luggage room screen structure in the related art is moved along a guide groove formed on the luggage side trim in a state where a user holds the reinforcement board, and if the reinforcement board is locked on a stepped portion formed at an end of the guide groove, the screen is drawn out from the screen housing along the reinforcement board to finish the upper end of the luggage room, and thus the exposure of the luggage is intercepted.

However, according to the luggage room structure in the related art, it is required for a user to fix the reinforcement board to the stepped portion of the guide groove and to release the fixing state one by one in a state where the user holds the reinforcement board, and this may troubles the user. Also, the end portion of the reinforcement board may be caught in the guide groove to disturb the smooth return of the luggage room screen.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an auto return structure of a luggage room screen, which makes it possible to perform auto return of the screen through improvement of a guide portion that is formed in a luggage side trim and an end portion of a reinforcement board of the luggage room screen that is installed in the guide portion.

In an aspect of the present invention, the auto return structure of a luggage room screen, may include a guide portion formed to a luggage side trim toward the rear of a vehicle body, and a reinforcement board movably installed in the guide portion to draw out a screen that may be wound on a screen housing provided in the luggage side trim, wherein the guide portion may include a guide groove formed to the luggage side trim toward the rear of the vehicle body and slidably receiving an end portion of the reinforcement board therein to guide the end portion of the reinforcement board toward the rear of the vehicle body, wherein the guide groove may have an upper surface and a lower surface, a movement groove formed to connect from ends of the lower and upper surfaces of the guide groove toward an upper part of the vehicle body with a predetermined distance to guide the end portion of the reinforcement board toward the upper part of the vehicle body along the movement groove, and a locking protrusion which may be formed on an upper connection portion connecting the movement groove and the upper surface of the guide groove and to which the end portion of the reinforcement board may be selectively inserted and fixed.

The end portion may include an upper leg and a lower leg and a locking groove may be formed therebetween, wherein the upper leg of the end portion may be selectively engaged between the locking protrusion and an inner surface of the movement guide, and wherein a mass center of the end portion of the reinforcement board may be formed to be offset upwards from a mass center of the locking protrusion while the locking protrusion may be inserted and fixed to the locking groove.

The locking protrusion may be formed to project in inclination toward a lower part of the vehicle body with a predetermined angle, and may be selectively inserted and fixed to a locking groove formed on the end portion of the reinforcement board.

An upper surface of the locking groove may be formed in inclination substantially at the same inclination angle as that of the locking protrusion while the locking protrusion may be inserted and fixed to the locking groove.

On an upper portion of the movement groove, an upper support portion may be formed to the movement groove to position the locking protrusion and the locking groove substantially on the same line to support the end portion of the reinforcement board.

A lower connection portion connecting the movement groove and the lower surface of the guide groove may have a lower support portion formed thereon in which the end portion of the reinforcement board may be selectively locked, and the lower support portion may be formed along a vertical line of the locking protrusion.

The distance between the lower support portion and the locking protrusion may be set to be equal to or longer than a longitudinal length of the end portion of the reinforcement board.

The guide groove may be formed to be bent toward the lower part of the vehicle body as being curved toward the rear of the vehicle body.

An inclination angle b° of an inclined surface of the lower support portion that may be connected to the guide groove may be set to be larger than an inclination angle a° of the locking protrusion An inclination angle c° of an inclined surface of the movement groove that may be connected to the lower support portion may be set to be larger than an inclination angle b° of the inclined surface of the lower support portion.

An inclination angle d° from the upper support portion to the lower support portion around the locking protrusion may be set to be larger than an inclination angle c° of the inclined surface of the movement groove that may be connected to the lower support unit.

With the above-described construction according to the present invention, it is possible to perform the auto return of the screen through improvement of the guide portion that is formed in the luggage side trim and the end portion of the reinforcement board of the luggage room screen that is installed in the guide portion, and thus the user's convenience and the productivity can be increased.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
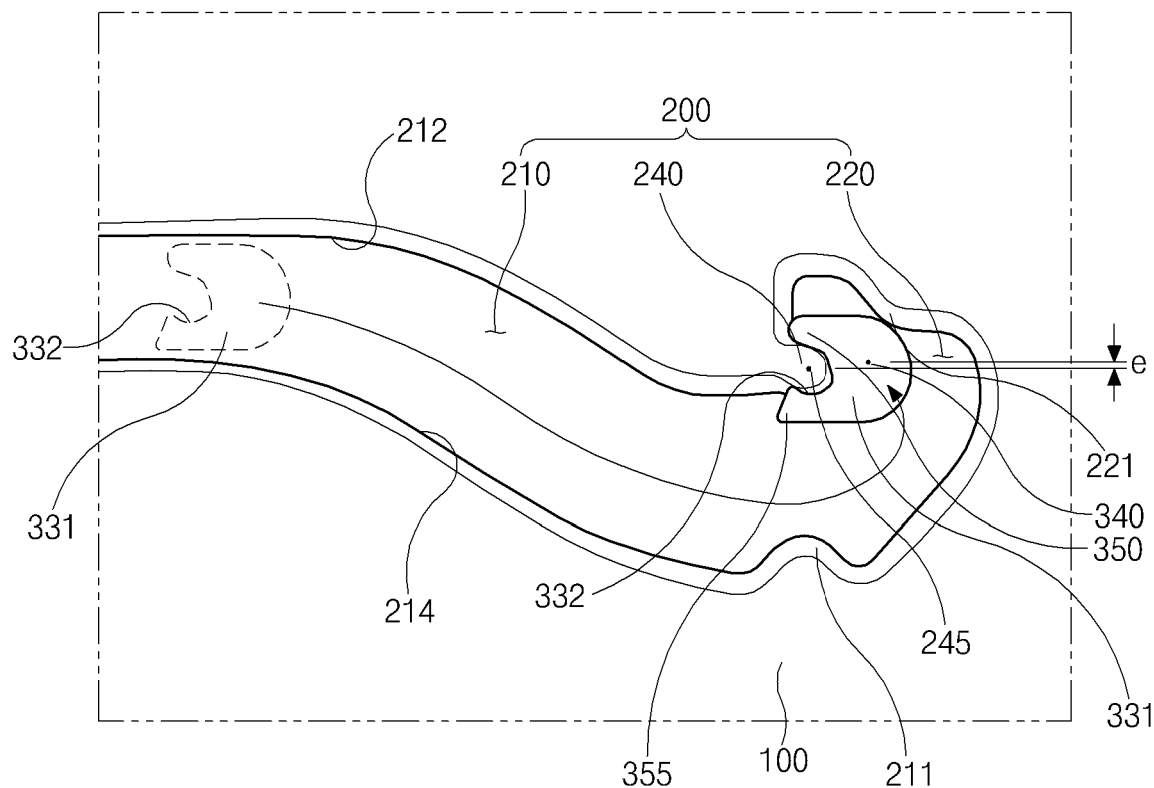
FIG. 1 is a view illustrating an auto return structure of a luggage room screen according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An auto return structure of a luggage room screen according to an exemplary embodiment of the present invention is a technique, which makes it possible to perform auto return of the screen through improvement of a guide portion 200 that is formed in a luggage side trim and an end portion 331 of a reinforcement board 330 of a screen device 300 that is movably installed in the guide portion 200.

Figure 2:
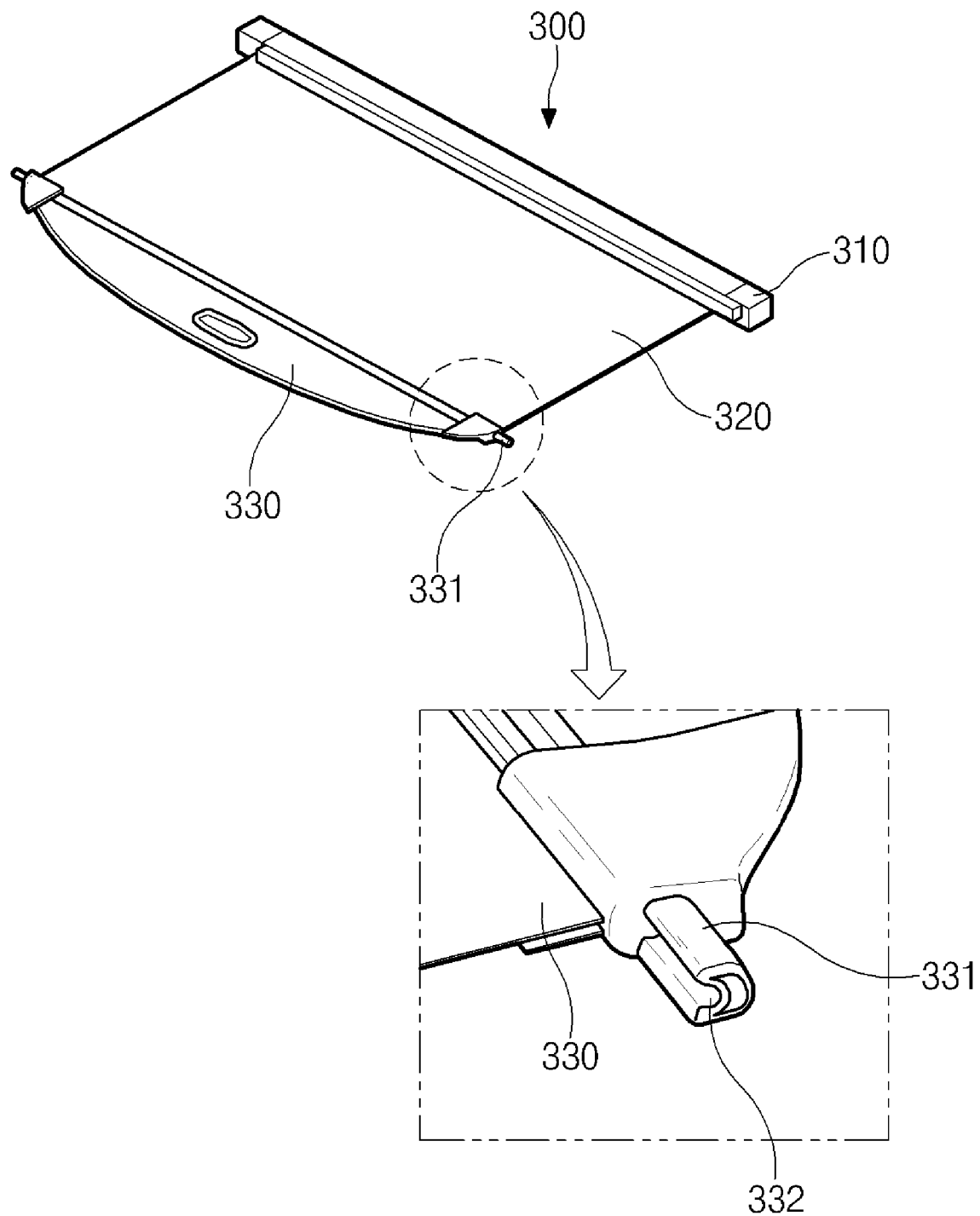
FIG. 2 is a perspective view illustrating a screen device according to an exemplary embodiment of the present invention.

The auto return structure of a luggage room screen according to an exemplary embodiment of the present invention, as illustrated in FIGS. 1 and 2, includes the guide portion 200 formed on a luggage side trim 100 that is an inner wall surface of a luggage room, and the screen device 300 which is installed across the luggage room in the left/right direction (in the vehicle width direction) of a vehicle body and is installed along the guide portion 200 if necessary in a state where a screen is inserted into the guide portion 200.

The guide portion 200 has a structure that makes the screen drawn out from the screen device 300 automatically returned, and includes a guide groove 210, a movement groove 220, and a locking protrusion 240.

The guide groove 210 is to guide the end portion 331 of the reinforcement board 330 toward the rear of the vehicle body, and is formed to connect to the luggage side trim 100 toward the rear of the vehicle body. The end portion of the reinforcement board is movably installed in the guide groove, and an end of the guide groove 210 is formed to be gradually inclined toward the lower part of the vehicle body.

That is, the end portion of the guide groove 210 is formed to be bent toward the lower part of the vehicle body as being smoothly curved toward the rear of the vehicle body.

The movement groove 220 is formed to extend from the upper and lower surfaces 212 and 214 of the guide groove 210 to an upper part of the vehicle body, and more particularly, to extend in the form of a semicircle toward the upper part of the vehicle body.

Figure 3:
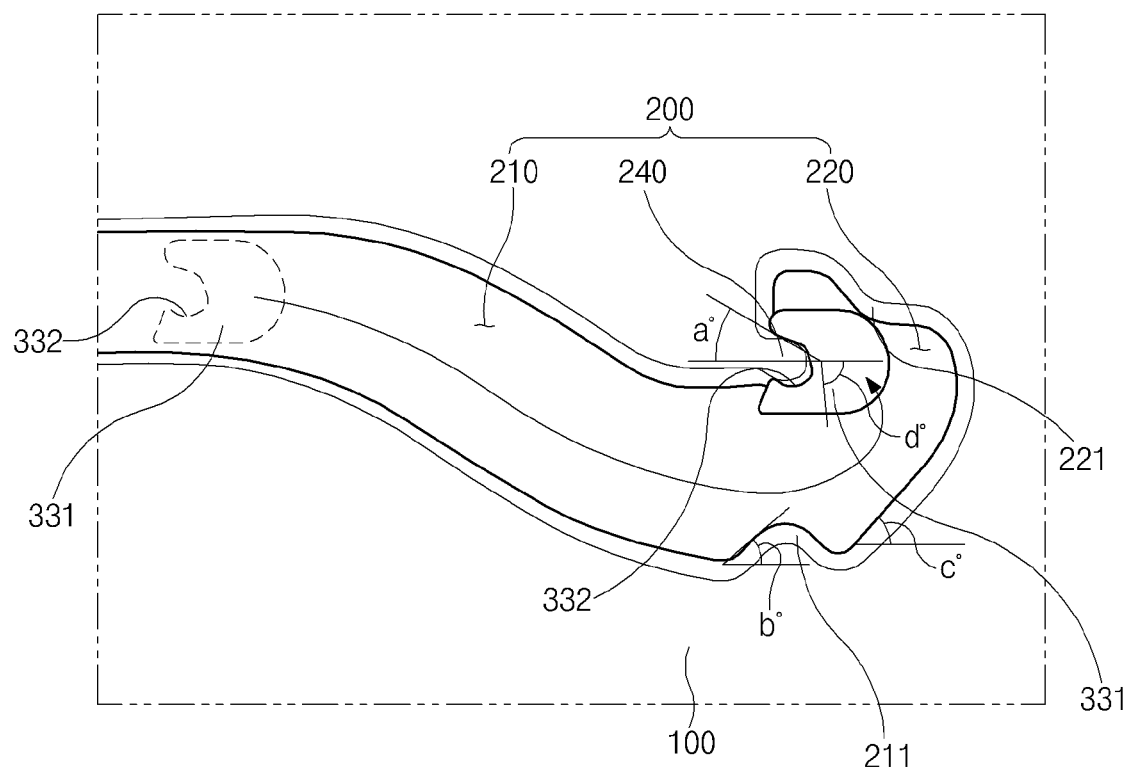
FIG. 3 is a view illustrating angle relationships of au auto return structure of a luggage room screen according to an exemplary embodiment of the present invention.

Here, on the lower connection portion of the movement groove 220 and the guide groove 210, a lower support portion 211 is formed to project in the inner direction (in the upper direction as seen in FIG. 3), and the lower support unit 211 is positioned on the vertical line of the locking protrusion 240.

The lower support portion 211 as described above locks the return of the end portion 331 of the reinforcement board 330 that moves to the guide groove 210 along the movement groove 220, and thus safe operation is guided with the speed reduced.

The locking protrusion 240 is formed to project to the upper connection portion of the guide groove 210 and the movement groove 220 in the rear direction (toward the rear of the vehicle body).

Here, the locking projection 240 is formed to be downwardly inclined at a predetermined angle, and through this, the end portion 331 of the reinforcement board 330 that is locked on the locking protrusion 240 is easily rotated to facilitate the secession of the locking protrusion.

On the other hand, on the upper connection portion of the movement groove 220 and the guide groove 210, an upper support portion 221 is formed to project in the inner direction (in the lower direction as seen in FIG. 3), and the upper support unit 221 supports the end portion 331 of the reinforcement board 330 that is moved to the movement groove 220, and makes the locking protrusion 240 and a locking groove 332 positioned substantially on the same line, and thus guides the end portion 331 of the reinforcement board 330 to be inserted into the locking protrusion 240.

In an exemplary embodiment of the present invention, the locking groove 332 may be formed by an upper leg 350 and a lower leg 355 wherein the locking groove 332 is disposed therebetween.

The screen device 300, as illustrated in FIG. 2, is provided in the luggage room, and is installed across the luggage room in the left/right direction (in the vehicle width direction) of a vehicle body. The screen device 300 includes a screen housing 310 fixed to the luggage side trim 100, a screen 320 which is wound on a rotary roll in the screen housing 310 and is drawn through an outlet of the screen housing 310, and the reinforcement board 330 which is connected to the front end of the screen 320 and the end portion of which is movably installed in the guide portion 200.

The rotary roll has an elastic restoring force by a spring, and thus the screen 320 wound on the rotary roll is maintained unless an external force is applied thereto.

Here, the end portion 331 of the reinforcement board 330 includes a vertical surface and a curved surface in the form of a semicircle, and the locking groove 332 is formed on the vertical surface so that the locking protrusion 240 is inserted into the locking groove 332.

On the other hand, the interlocking groove 332 formed on the reinforcement board 330 and the locking protrusion 240 of the guide portion 200 are positioned to correspond to each other.

The auto return structure of the luggage room screen as constructed above, as illustrated in FIG. 3, has an inclination angle a° of the locking protrusion 240, an inclination angle b° of the lower support portion 211 connected to the guide groove 210, an inclination angle c° of the movement groove 220 connected to the lower support unit 211, and an inclination angle d° from the upper support portion 221 to the lower support portion 211 around the locking protrusion 240 (where, a°<b°<c°<d°).

That is, the inclination angle a° of the locking protrusion 240 is formed to be inclined downwardly from the ground, and the upper surface of the locking groove 332 is formed to be inclined at the same angle so that the upper surface of the locking groove 332 becomes in close contact with the inclined angle a° of the locking protrusion 240.

The inclination angle b° of the lower support portion 211 connected to the guide groove 210 is formed to be larger than the inclination angle a° of the locking protrusion 240, and thus the locking force of the end portion 331 of the reinforcement board 330 is increased.

Also, the inclination angle c° of the movement groove 220 connected to the lower support unit 211 is formed to be larger than the inclination angle b° of the lower support portion 221, and thus the end portion 331 of the reinforcement board 330 is prevented from being caught in the groove.

Also, the inclination angle d° from the upper support portion 221 to the lower support portion 211 around the locking protrusion 240 is formed to be larger than the inclination angle c° of the movement groove 220 connected to the lower support unit 211. Considering that the end portion 331 of the reinforcement board 330 can secede from the locking protrusion 240 if the end portion 331 of the reinforcement board 330 locked on the locking protrusion 240 is sufficiently rotated as large as the inclination angle d°, the end portion 331 of the reinforcement board 330 fixed to the locking protrusion 240 is prevented from seceding due to the self-movement.

The operation of the auto return structure of a luggage room screen as constructed above will now be described with reference to FIG. 4.

Figure 4:
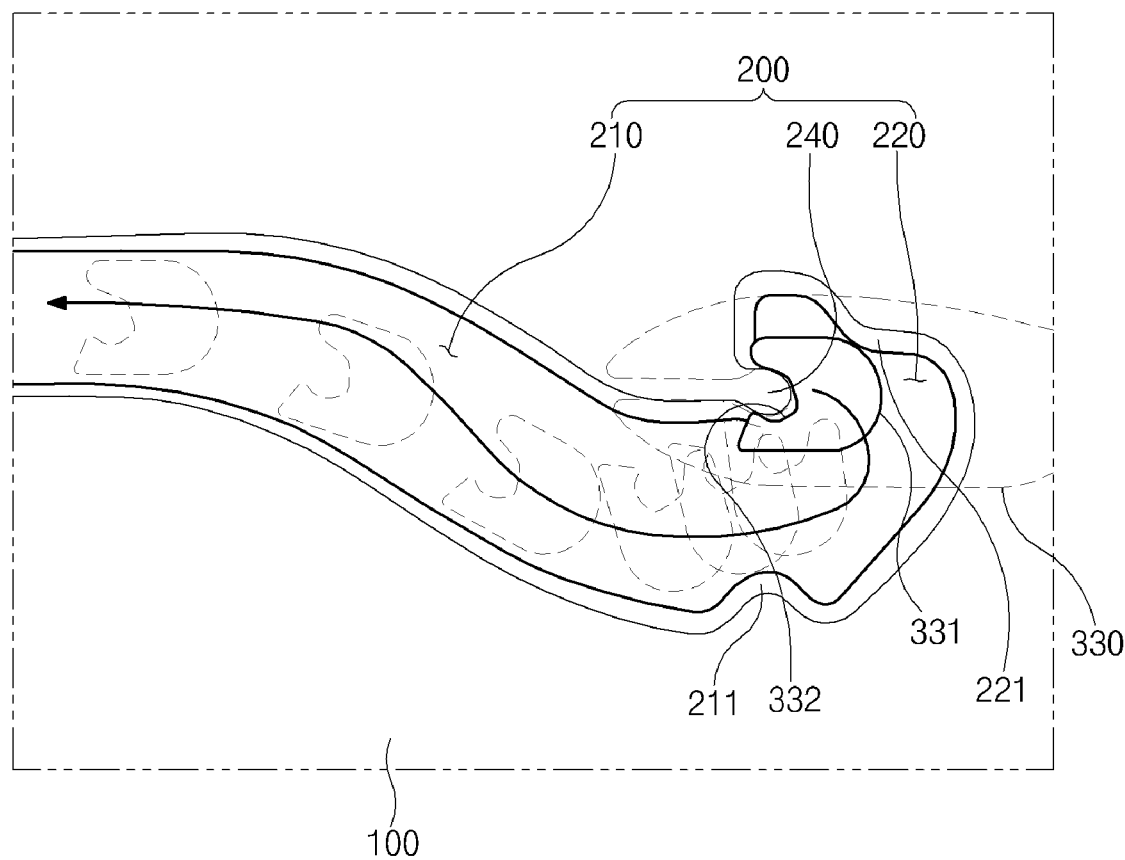
FIG. 4 is a view illustrating an operation state of an auto return structure of a luggage room screen according to an exemplary embodiment of the present invention.

As illustrated in FIG. 4, if a user pulls the reinforcement board 330 toward the rear of the vehicle body in a state where the user holds the reinforcement board 330, the end portion 331 of the reinforcement board 330 is moved to the movement groove 220 along the guide groove 210. At this time, the screen 320 is drawn out from the screen housing 310 along the reinforcement board 330 to finish the upper portion of the luggage room.

Then, the end portion 331 of the reinforcement board 330 is supported by the upper support portion 221, and the locking protrusion 240 is locked in the locking groove 332 of the reinforcement board 330.

In particular, the upper leg 350 is coupled between the locking protrusion 240 and the upper support portion 221.

The mass center 340 of the end portion 331 is biased upward the mass center 245 of the locking protrusion 240, such that the end portion 331 is biased upwards and thus the upper leg 350 is firmly coupled between the locking protrusion 240 and the upper support portion 221.

Then, the end portion 331 of the reinforcement board 330 is fixed to the locking protrusion in a locked state by the elastic restoring force acting on the screen that is wound on the rotary roll.

Then, in the case of removing the screen 320 that has finished the upper portion of the luggage room, if the reinforcement board 330 is pressed, the end portion 331 of the reinforcement board 331 is rotated in the lower direction around the locking protrusion 240. In this case, if the rotating angle of the end portion 331 becomes equal to or larger than the inclination angle d°, the center of gravity is changed, and the end portion 331 of the reinforcement board 330 is automatically moved along the guide portion 200 as indicated by dotted line in FIG. 4 to make the screen 320 drawn into the screen housing 310.

In this case, if the end portion 331 of the reinforcement board 330 is moved from the movement groove 220 to the guide groove 210, the movement radius of the reinforcement board 330 is minimized as the end portion 331 is supported by the lower support portion 221, and thus a prompt return can be guided.

For convenience in explanation and accurate definition in the appended claims, the terms "upper", "lower", "inner", "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An auto return structure of a luggage room screen, comprising:
   a guide portion formed to a luggage side trim toward the rear of a vehicle body; and
   a reinforcement board movably installed in the guide portion to draw out a screen that is wound on a screen housing provided in the luggage side trim;
   wherein the guide portion includes:
   a guide groove formed to the luggage side trim toward the rear of the vehicle body and slidably receiving an end portion of the reinforcement board therein to guide the end portion of the reinforcement board toward the rear of the vehicle body, wherein the guide groove has an upper surface and a lower surface;
   a movement groove formed to connect from ends of the lower and upper surfaces of the guide groove toward an upper part of the vehicle body with a predetermined distance to guide the end portion of the reinforcement board toward the upper part of the vehicle body along the movement groove; and
   a locking protrusion which is formed on an upper connection portion connecting the movement groove and the upper surface of the guide groove and to which the end portion of the reinforcement board is selectively inserted and fixed, and wherein the end portion includes an upper leg and a lower leg and a locking groove is formed therebetween.

2. The auto return structure according to claim 1, wherein the upper leg of the end portion is selectively engaged between the locking protrusion and an inner surface of the movement guide.

3. The auto return structure according to claim 2, wherein a mass center of the end portion of the reinforcement board is formed to be offset upwards from a mass center of the locking protrusion while the locking protrusion is inserted and fixed to the locking groove.

4. The auto return structure according to claim 1, wherein the locking protrusion is formed to project in inclination toward a lower part of the vehicle body with a predetermined angle, and is selectively inserted and fixed to a locking groove formed on the end portion of the reinforcement board.

5. The auto return structure according to claim 4, wherein an upper surface of the locking groove is formed in inclination substantially at the same inclination angle as that of the locking protrusion while the locking protrusion is inserted and fixed to the locking groove.

6. The auto return structure according to claim 5, wherein on an upper portion of the movement groove, an upper support portion is formed to the movement groove to position the locking protrusion and the locking groove substantially on the same line to support the end portion of the reinforcement board.

7. The auto return structure according to claim 5, wherein a lower connection portion connecting the movement groove and the lower surface of the guide groove has a lower support portion formed thereon in which the end portion of the reinforcement board is selectively locked, and the lower support portion is formed along a vertical line of the locking protrusion.

8. The auto return structure according to claim 7, wherein the distance between the lower support portion and the locking protrusion is set to be equal to or longer than a longitudinal length of the end portion of the reinforcement board.

9. The auto return structure according to claim 7, wherein the guide groove is formed to be bent toward the lower part of the vehicle body as being curved toward the rear of the vehicle body.

10. The auto return structure according to claim 7, wherein an inclination angle b° of an inclined surface of the lower support portion that is connected to the guide groove is set to be larger than an inclination angle a° of the locking protrusion.

11. The auto return structure according to claim 7, wherein an inclination angle c° of an inclined surface of the movement groove that is connected to the lower support portion is set to be larger than an inclination angle b° of the inclined surface of the lower support portion.

12. The auto return structure according to claim 7, wherein an inclination angle d° from the upper support portion to the lower support portion around the locking protrusion is set to be larger than an inclination angle c° of the inclined surface of the movement groove that is connected to the lower support unit.

* * * * *